DATA TRACKING SYSTEM

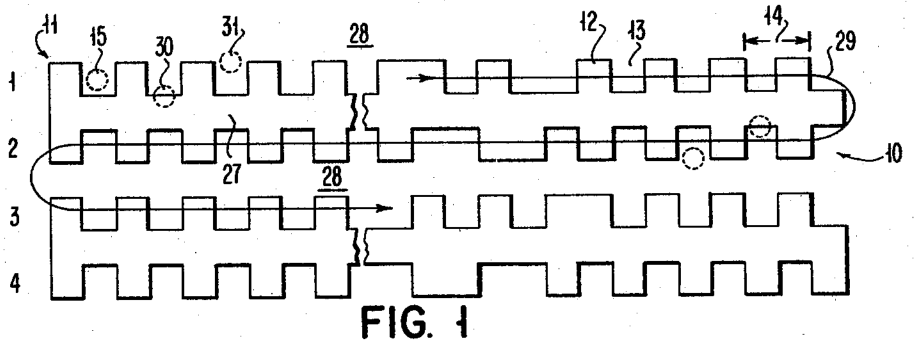
FIG. 1
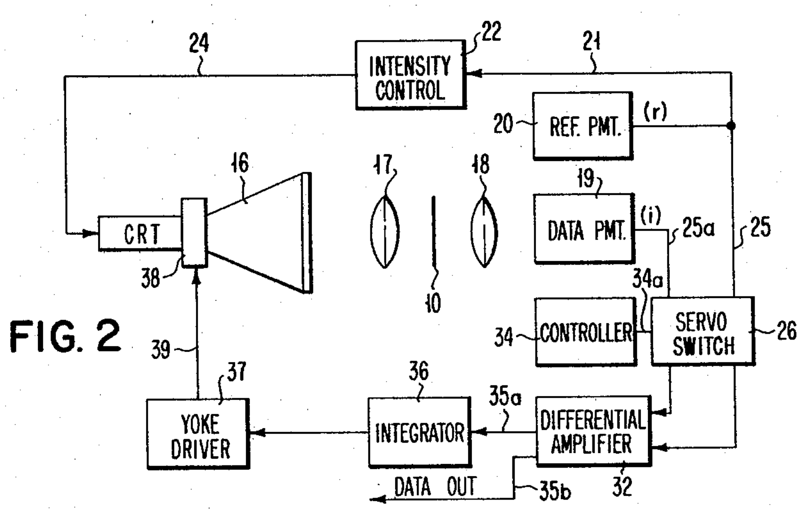
FIG. 2
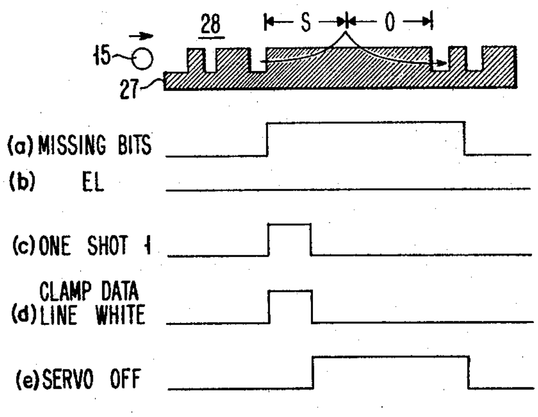
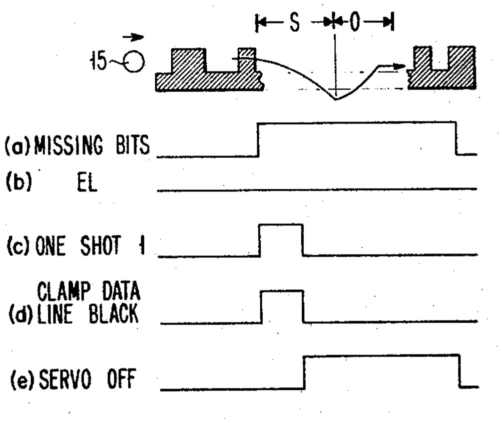
FIG. 4 FIG. 5
*INVENTOR.*
ROY A. JENSEN
BY Gerald L. Moore
ATTORNEY Oct. 21, 1969 R. A. JENSEN 3,474,418

Filed June 19, 1967 2 Sheets-Sheet 2

United States Patent Office 3,474,418
Patented Oct. 21, 1969

3,474,418
DATA TRACKING SYSTEM

Roy Albert Jensen, San Jose, Calif., assignor to International Business Machines Corporation, Armonk, N.Y., a corporation of New York Filed June 19, 1967, Ser. No. 646,865
Int. Cl. G11b 9/00; G05b 1/00; H04n 5/38
U.S. Cl. 340—173 7 Claims

ABSTRACT OF THE DISCLOSURE

In a system in which a data reading transducer scans data lines separated alternately by an opaque strip and a transparent strip, a servo system for aligning the transducer wtih the data track by utilizing a servo feedback signal, which system when a missing bit area on the record is encountered automatically functions to hold the transducer aligned with the data track until the area is passed.

RELATED PATENT APPLICATIONS

This invention relates to a tracking system of the type described in the U.S. Patent 2,843,841, "Information Storage System," issued July 15, 1958. Additionally, U.S. Patent applications Ser. No. 509,080 entitled "Optical Tracking and Switching System" filed on Nov. 22, 1965 and Ser. No. 609,437 entitled "Margin Turn-a-round Technique for Photodigital Reader" filed on Jan. 16, 1967 relate to similar subject matter and are assigned to the assignee of this application.

BACKGROUND OF THE INVENTION

Field of the Invention

This invention pertains to scanning systems for reading data stored on memory elements, and more particularly to scanning systems utilizing a light or electron beam or the like for reading lines of data recorded on an element and employing a servo tracking control to maintain the beam in alignment with the data track.

Description of the prior art

The above-identified references all are representative of the prior art in describing data recording systems in which the data is recorded in digital form along lines having always a transparent area to one side of the line and an opaque area to the other side for generating a servo signal to maintain the reading transducer in alignment with the data track. At the high densities at which data is recorded, it is important that close control be maintained over the alignment of the transducer and the data to assure that the transducer does not skip from one track to another or otherwise wander off the data track to read the data erroneously. Error correction coding used today is sufficient to supply missing information for up to six characters thereby somewhat lessening the overall effect of such flaws on the data reading system. However, to allow such an error correction system to function, it is necessary to maintain the transducer in alignment with the same data track as it traverses any flaw areas to assure that all data present is detected since obviously the system cannot reconstruct complete blocks of data.

In using a tracking system which detects opaque or transparent regions or similar techniques for supplying the servo signal, the flaws can serve not only to blank out the data, but additionally to misguide the tracking system by supplying erroneous tracking data. Depending upon whether the flaw is transparent or opaque (and such cannot be predicted), a tracking servo will continue to deviate the transducer in a direction lateral to the track as a flaw is present and thereafter can lock onto an adjacent track after the flaw is passed to cause large portions of the data to be omitted.

The primary object of the present invention is to provide a tracking control for a data read system which will accurately guide the transducer across missing bit areas on the record element.

Another object of this invention is to provide a servo actuated tracking system for a transducer which generates a signal responsive to the relative position of the transducer and a data track, and upon encountering a missing bit area, will sense the presence of a missing bit condition and deactivate automatically the tracking system so as to maintain the transducer in general alignment with the data track as it moves across the missing bit area.

Another object of this invention is to provide a servo-actuated tracking system for a beam readout device which automatically guides the beam along the data track, realigns the beam with the data if misalignment occurs either in the presence or absence of data bits, and holds the position of the beam steady as missing bit areas are encountered to prevent the beam from jumping to another data track.

SUMMARY OF THE INVENTION

A tracking system wherein a transducer is guided along the data track by the generation of a servo signal responsive to the relative position of the transducer and the data track, and including means for sensing missing data areas and preventing relative lateral movement between the data track and the transducer when the transducer encounters a missing data area thereby allowing the system to lock onto the same data track after the missing bit area is passed.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGURE 1 represents a preferred type of data track with which the subject invention can be used;

FIGURE 2 is a block diagram of a typical prior art CRT scanning control system;

FIGURE 4 illustrates selected control signal levels in the control of FIGURE 3 when an opaque missing bit area is encountered; and, FIGURE 5 illustrates selected control signal levels in the control of FIGURE 3 when a transparent missing bit area is encountered.

DESCRIPTION OF A PREFERRED EMBODIMENT OF THE INVENTION

Figure 3:
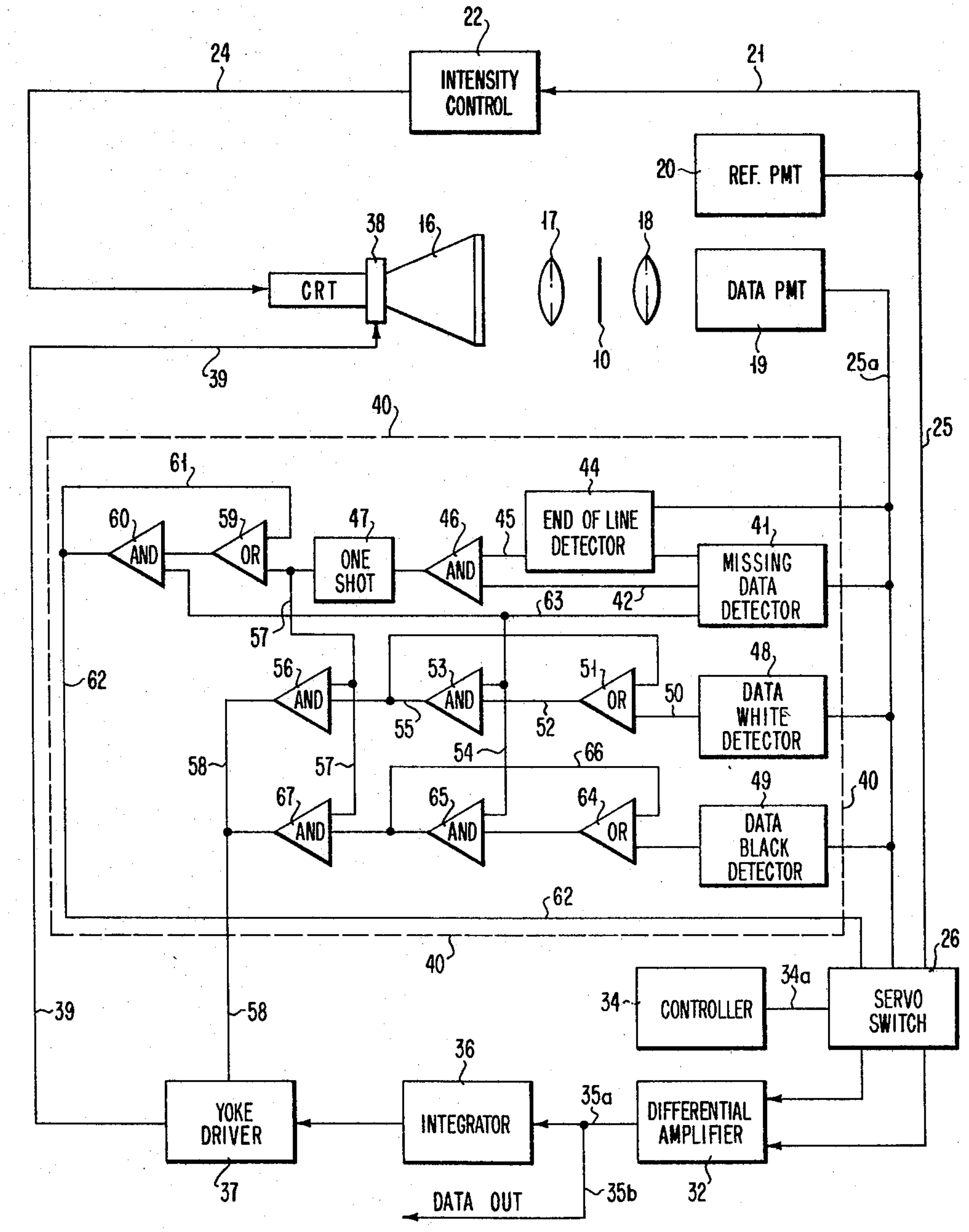
FIGURE 3 is a block diagram of a scanning control system similar to that of FIGURE 2 and incorporating the subject invention.

In the preferred embodiment, the invention will be described for use in a photographic store application. However, it will be apparent to those skilled in the art that the described technique is readily applicable to other types of storage systems to include, for instance, those employing thermoplastic and magnetic storage elements.

FIGURES 1 and 2 show a typical prior art data track and tracking system used in a photographic store application and in which the subject invention can be used. In such a system, information in digital form is recorded on a memory element 10 in lines or tracks 11. In a photographic store, the element 10 can be a silver halide light-sensitive film with the recording being effected by exposing the film to an electron beam. The information is extracted from the memory element by scanning a radiant energy beam in the form of a light beam along a data line and detecting the intensity modulation of the beam caused by passage through the element. Such modulation is caused by the alternate opaque and transparent portions 12 and 13 representing the data. In this instance, a data bit is recorded along the length 14 of a line with a "1" being represented by a bit having an opaque area followed by a transparent area and a "0" being represented by a transparent area followed by an opaque area.

The light beam is represented by the spot 15 preferably generated in a CRT 16. The beam is imaged by means of a lens 17 onto the memory element 10. The light from the CRT is modulated by the code pattern on the element and thereafter is imaged by a lens 18 onto a data photomultiplier tube or PMT 19. Also in optical association with the light beam of the CRT is a reference PMT. Thus, the combination of the CRT 16 and the PMT 19 and PMT 20 form a readout transducer. The output signal from the reference PMT is passed along the conductor 21 to an intensity control means 22 which is operative through the conductor 24 to vary the intensity of this spot thereby to maintain the beam intensity substantially constant. The PMT 20 output signal is also fed along the conductor 25 to a servo switch 26.

The tracking system which is utilized for maintaining the beam in alignment with the data line is gray level sensitive. A gray level sensing technique may be utilized since the information is recorded on a storage element by combining opaque and transparent bits or bit portions. Thus, in each line there is an equal number of opaque and transparent areas. Each two lines of code, numbered consecutively in FIGURE 1, are recorded back-to-back separated by an opaque bar 27. On the other side of each code line is a transparent area 28.

When the scanning spot is centered properly relative to a data line the predictable gray level is generated which is sensed by the data PMT 19. However, if the spot track varies laterally relative to the line 11 the spot will scan partially or totally on the tracking markings including an all opaque or transparent area 27 or 28. For instance, as the spot varies to the right (as indicated by the spot 30) the opaque line 27 is encountered, while if the spot varies to the left (as indicated by the spot 31) the transparent portion will be traced. As a result, either a higher or lower light level is detected by the PMT 19 indicating need for aligning the spot with the data track. Thus, a servo control is provided to detect such a condition and for realigning the spot on the data track.

In the tracking control of FIGURE 2, the output signals from the data PMT 19 and reference PMT 20 are passed through a servo switch 26 into a differential amplifier 32. The servo switch is controlled by means of a controller 34 supplying a signal through the line **34*a* for indicating whether the beam is scanning an odd or even numbered data line thereby allowing the control to determine correctly the direction laterally the spot must be shifted if misalignment occurs. The differential amplifier 32 strips the data from the data PMT signal and supplies it to a place of use through the conductor 35*b*. An additional output signal from the differential amplifier is supplied through a line 35*a* and comprises a DC signal of a level relative to ground indicative of whether the PMT detects a low, gray or high light level responsive to the tracking position of the spot. This output signal from the differential amplifier is supplied through an integrator or filter 36 to a yoke driver 37 which in turn controls the energization of a deflecting coil 38 by means of a signal supplied through the line 39. Thus, if a low light level is detected by the data PMT (which would occur when the spot is in the position of the spot 30, FIGURE 1) the deflection coil is energized to move the spot to the left. Conversely, if a high light level is detected (as would occur when the spot is in the position of spot 31), the deflection coil is energized to move the spot laterally to the right. In this manner, the spot is maintained as nearly as possible on the tracking line 29** to scan the data lines in numerical sequence in the manner indicated by that tracking line. A further explanation of such a tracking system can be obtained by referral to the U.S. application Ser. No. 509,080 referenced previously.

Experience has shown that the tracking system heretofore described functions very capably in maintaining the transducer and data in alignment for reading the data. Additionally, error correction systems are employed in the coding so that the data can be reconstructed even though a few bits are not detected during the readout process. However, in the past, difficulties have been encountered when a portion of the entire data line is obscured or otherwise missing. Such a condition occurs as a result of such unpredictable occurrences as flaws in the memory element, dirt on the memory element, or a malfunction of the data recorder. For the most part, such missing bit areas are either opaque or transparent in their light conducting qualities thereby causing the tracking control to erroneously sense misalignment of the beam with the data track and subsequently divert the beam. Naturally, if the missing bit area is small, the diversion of the beam will not be sufficient to misalign the beam with the same data line after the area is passed. However, if the missing bit area is large, the diversion of the beam may be sufficient to align the beam with another data line when it reaches the other side of the missing bit area thereby giving an erroneous reading sequence of the data recorded.

In accordance with the present invention, a tracking system is provided for guiding the transducer along the data track by the generation of the servo signal responsive to the relative position of the transducer and data track in the manner previously described, in combination with a missing data control incorporating means for sensing missing data areas and for preventing relative lateral movement between the data and the transducer when the transducer encounters such a missing data area thereby allowing the system to lock onto the same data track after the missing data area is passed.

More specifically, the subject novel missing data control remains inactive so long as data is detected by the prior art control heretofore described. Upon the occurrence of a missing data area, the subject control is activated after the missing data area has continued for a sufficient scan time to cause misalignment of the spot with the original data track by the normal action of the tracking control. The control thereafter detects the type of missing data area encountered, i.e., whether opaque or transparent, and subsequently realigns the spot with the original scanning track before inactivating the tracking control to prevent further misalignment of the spot with the original data track until the missing data area is passed. Additionally, the control includes means for detecting when the transducer has reached the end of a line so that the control will not misinterpret an end-of-line condition for a missing bit condition and thereafter react erroneously in attempting to redirect the spot.

As shown in FIGURE 3, a preferred embodiment of the invention includes the control of FIGURE 2 with identical numbers utilized to identify the like components, in combination with a missing data servo 40 to perform the functions heretofore described. Thus, the control functions precisely as described with the additional capability of guiding the spot across missing data areas in realigning the spot with the same data track after the missing data area is passed. To accomplish this purpose, the missing data servo 40 incorporates a missing data detector 41 which receives a signal from the data PMT 19 through the line **25*a***. As previously discussed, the missing data areas are almost always either transparent or opaque to thereby greatly increase or decrease the signal level generated by the data PMT because of the lesser or greater transmission of light in comparison with the gray level normally detected, as the light passes through the memory element.

Upon the occurrence of a missing data area, the missing data detector (which is actually an electronic switch actuated in response to a signal level in a line 25*a* indicative that the data PMT is detecting other than a gray level light) is triggered to actuate the missing data servo. Thus, a signal *a* (FIGURES 4 and 5) is supplied through the line 42 to an AND junction 46 which normally also receives a signal *b* from an end-of-line detector 44 through the conductor 45. The end-of-line detector in the preferred embodiment is a counter acting responsive to the number of data bits which have been read since the previous turn-around of the spot to start a new line scan. Upon receiving signals through the lines 42 and 45, the AND junction 46 provides a signal to trigger a one-shot 47 which supplies signal *c* to actuate the missing data servo for a predetermined period of time.

Concurrently with the actuation of the missing data detector 41, the signal from the data PMT is supplied to a data white detector 48 and a data black detector 49. These detectors are standard electronic switches selected to be closed individually upon the occurrence of high or low level signals respectively from the data PMT. Thus, with the variance with the signals supplied by the PMT 19 to a high level indicating a transparent missing data area, the data white detector 48 is closed to supply an actuating signal *d* (FIGURE 5) through the conductor 50 to an OR junction 51. Immediately, an actuating signal is supplied through the conductor 52 to the AND junction 53 which also receives a signal from the missing data detector 41 through the conductor 54. Upon energization of the AND junction 53, a signal is provided to the conductor 55 which is fed back through the OR juncture 51 to lock the OR junction in the "on" condition, and additionally is fed to the AND junction 56 which is triggered for the time interval of the one shot 47 by receiving a signal therefrom through the conductor 57. Thus, the AND junction supplies a signal through the conductor 58 to the yoke driver 37 for the period determined by the time of actuation of the one shot 47. The purpose of this signal is to drive the spot back in the opposite lateral direction (during the scan time O in FIGURE 5) from which it was deviated (during the scan time S in FIGURE 5) because of the erroneous tracking signal generated initially upon encountering the missing data area to again lock the spot in alignment with the original data track.

The one shot 47 has concurrently been supplying a signal to an OR juncture 59 which supplies to an AND junction 60 a signal. This AND junction 60 receives at the other terminal a signal from the line 63 generated by the missing data detector 41 which turns the juncture "on." A feedback signal through the line 61 now holds the OR junction 59 "on." Upon cycling of the one shot 47, the OR juncture 59 remains locked "on" by the feedback of the output of the AND junction through the conductor 61, and additionally supplies the signal *e* through the conductor 62 to the servo switch 26 to shut off the tracking servo. Thus, further misalignment of the spot is prevented until this missing data area is passed.

After the missing data area is passed, the missing data detector 41 is shut off thereby serving to shut off the AND detectors 46 and 53 and through the circuit heretofore described, serving to turn on the servo switch 26 to permit the normal tracking servo to function in the normal manner. Of course if the end of the line is reached before the missing data area is passed, the end-of-line detector 44 will be actuated to prevent the transmission of the signal through the conductor 45 to the AND juncture 46 thereby also shutting off the missing data servo to permit the tracking servo to function normally.

Conversely, if the missing data area is opaque as shown in FIGURE 4, the spot first will be guided erroneously out of alignment with the track by being shifted to the left of the aligned position desired during the scan period S. Under these conditions the circuit of the data white detector will not be activated since a low light level signal is supplied through the line 25*a*. The data black detector 49 will be closed instead thereby activating the OR junction 64 and the AND junction 65 to lock the circuit in the "on" condition by a signal supplied through conductor 66. Thereafter, the AND junction 67 will be energized during the firing of the one shot 47 to move the spot 15 (FIGURE 4) back to the original track during the scanning period O (FIGURE 4) by supplying the signal *d* to the yoke driver 37. After the one shot 47 fires, the OR junction 59 and AND junction 60 are closed to supply the signal *e* to the servo switch 26 to shut off the tracking servo unit data is again detected or an end-of-line condition is reached.

From the foregoing, it can be seen that the subject control can be incorporated in any tracking servo system using a feedback signal means for positioning a transducer relative to a data track of the type described. While the invention has been particularly shown and described with reference to a preferred embodiment thereof, it will be understood by those skilled in the art that various changes in form and details may be made therein without departing from the spirit and scope of the invention.

I claim as my invention:

1. In a storage system wherein data is stored in tracks on a record member and read by moving a transducer along said tracks, a tracking control system comprising,
- means to cause relative movement between said transducer and record member,
- a servo control for guiding said transducer along a data track,
- means to detect missing data areas along said track; and
- means to deactivate said servo control in response to the detection of a missing data area thereby to prevent said servo control from erroneously guiding said transducer out of alignment with the desired data track.

2. In a storage system as defined in claim 1 wherein said means to cause relative movement includes scanning means for causing relative movement in a general direction along said data tracks and tracking means for causing movement between the transducer and data track in a direction lateral to said data track, with said tracking means being under the regulation of said servo control.

3. A storage system as defined in claim 2 wherein said data track includes markings to signal said servo control the relative position of said transducer and data track.

4. A storage system as defined in claim 3 wherein said markings includes a solid data line to one side of said data track and no line on the other side of said data track.

5. A storage system as defined in claim 4 wherein said tracking control system includes means energized responsive to said detecting means detecting a missing data area to activate said tracking means to move said transducer relative to said data track in the lateral direction opposite to any movement laterally which has been effected since the missing data area was encountered and before said servo control is deactivated thereby to realign said transducer and track.

6. A storage system as defined in claim 4 wherein said tracking control guides said transducer relative to said data track by reacting to the data signal detected by said transducer and if a solid line or no line is detected, said tracking control effects relative movement between the transducer and data track to guide the transducer in a direction back towards the data track.

7. A storage system as defined in claim 6 wherein said transducer includes a radiant energy beam which is scanned along said data track to read said data, and said beam is positioned by said servo control.

(References on following page)

References Cited

UNITED STATES PATENTS

| | | | |
|---|---|---|---|
| 2,604,534 | 7/1952 | Graham | 178—7.2 X |
| 2,851,521 | 9/1958 | Clapp | 179—100.3 X |
| 3,195,113 | 7/1965 | Giordano | 250—202 X |
| 3,221,337 | 11/1965 | Quinn et al. | 340—173 X |

STANLEY M. URYNOWICZ, Jr., Primary Examiner

J. F. BREIMAYER, Assistant Examiner

U.S. Cl. X.R.

178—7.2; 250—202